(12) United States Patent
Lohr et al.

(10) Patent No.: US 9,984,816 B2
(45) Date of Patent: May 29, 2018

(54) HAND-HELD POWER TOOL RECHARGEABLE BATTERY

(71) Applicant: Robert Bosch GmbH, Stuttgart (DE)

(72) Inventors: Guenter Lohr, Leinfelden-Echterdingen (DE); Dragan Krupezevic, Stuttgart (DE); Juergen Mack, Goeppingen (DE); Marcin Rejman, Waiblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 71 days.

(21) Appl. No.: 14/654,331

(22) PCT Filed: Dec. 18, 2013

(86) PCT No.: PCT/EP2013/077141
§ 371 (c)(1),
(2) Date: Jun. 19, 2015

(87) PCT Pub. No.: WO2014/096035
PCT Pub. Date: Jun. 26, 2014

(65) Prior Publication Data
US 2015/0357683 A1    Dec. 10, 2015

(30) Foreign Application Priority Data

Dec. 21, 2012  (DE) .................. 10 2012 112 876
Dec. 17, 2013  (DE) .................. 10 2013 226 232

(51) Int. Cl.
*H02J 7/00*      (2006.01)
*H01F 38/14*     (2006.01)
*H02J 50/10*     (2016.01)
*H01M 2/10*      (2006.01)
*H01M 10/46*     (2006.01)
*H02J 7/02*      (2016.01)
*H02J 17/00*     (2006.01)
(Continued)

(52) U.S. Cl.
CPC .......... *H01F 38/14* (2013.01); *H01M 2/1022* (2013.01); *H01M 2/1055* (2013.01);
(Continued)

(58) Field of Classification Search
CPC ...... H01F 38/14; Y02T 90/122; B60L 11/182; Y02E 60/12; H02J 5/005; H02J 7/025
(Continued)

(56) References Cited

U.S. PATENT DOCUMENTS

2001/0045785 A1   11/2001   Chen et al.
2007/0029965 A1    2/2007   Hui
(Continued)

FOREIGN PATENT DOCUMENTS

CN    101630857 A    1/2010
CN    102005783 A    4/2011
(Continued)

OTHER PUBLICATIONS

International Search Report for PCT/EP2013/077141, dated Apr. 15, 2014.

*Primary Examiner* — Arun Williams
(74) *Attorney, Agent, or Firm* — Norton Rose Fulbright US LLP; Gerard Messina

(57) ABSTRACT

A hand-held power tool rechargeable battery is provided as including a housing, at least one rechargeable battery cell, and an inductive charging unit, which includes at least one coil core and an inductive charging coil for charging the at least one rechargeable battery cell. It is provided that the inductive charging unit is accommodated detachably in the housing.

16 Claims, 8 Drawing Sheets

(51) Int. Cl.
*H01M 10/6554* (2014.01)
*H01M 10/617* (2014.01)
*H01M 10/6235* (2014.01)

(52) U.S. Cl.
CPC ............ *H01M 10/46* (2013.01); *H02J 7/025*
(2013.01); *H02J 17/00* (2013.01); *H02J 50/10*
(2016.02); *H01M 10/617* (2015.04); *H01M 10/6235* (2015.04); *H01M 10/6554* (2015.04); *H01M 2220/30* (2013.01)

(58) Field of Classification Search
USPC ....................................................... 320/108
See application file for complete search history.

(56) References Cited

U.S. PATENT DOCUMENTS

| | | | | |
|---|---|---|---|---|
| 2008/0061734 | A1* | 3/2008 | Roehm | B25F 5/02 320/108 |
| 2010/0164431 | A1 | 7/2010 | Sip et al. | |
| 2011/0188677 | A1* | 8/2011 | Rothkopf | H02J 7/00 381/150 |
| 2011/0241608 | A1* | 10/2011 | Adamczyk | H02J 7/025 320/108 |
| 2012/0104992 | A1* | 5/2012 | Suzuki | H01M 2/1055 320/103 |
| 2012/0146426 | A1* | 6/2012 | Sabo | H02J 7/025 307/104 |
| 2014/0327396 | A1* | 11/2014 | Rejman | H01M 10/44 320/108 |

FOREIGN PATENT DOCUMENTS

| | | |
|---|---|---|
| CN | 102484386 A | 5/2012 |
| CN | 202495554 U | 10/2012 |
| DE | 102006042602 | 3/2008 |
| EP | 0642203 | 3/1995 |
| JP | 2002-134177 A | 5/2002 |
| JP | 2008-294385 A | 12/2008 |
| JP | 2011-034793 A | 2/2011 |
| WO | WO2011/011681 | 1/2011 |

* cited by examiner

HAND-HELD POWER TOOL RECHARGEABLE BATTERY

BACKGROUND INFORMATION

A hand-held power tool rechargeable battery including at least one rechargeable battery cell and an inductive charging unit, which includes at least one coil core and an inductive charging coil for charging the at least one rechargeable battery cell, has already been provided.

SUMMARY

The present invention is directed to a hand-held power tool rechargeable battery including a housing, at least one rechargeable battery cell, and an inductive charging unit, which includes at least one coil core and an inductive charging coil for charging the at least one rechargeable battery cell.

It is provided that the inductive charging unit is accommodated in the housing in a detachable, in particular mechanically detachable, manner A "hand-held power tool rechargeable battery" is to be understood in particular as a device having at least one rechargeable battery cell and at least one set of electronics for a charge and discharge of the rechargeable battery cell, the device being provided to supply at least one hand-held power tool with electrical energy. The hand-held power tool rechargeable battery is preferably provided to be detachably coupled to the hand-held power tool by an operator, in particular without tools. Alternatively, the hand-held power tool rechargeable battery could be integrated into the hand-held power tool. A "hand-held power tool" is to be understood in this context as an electrical device which is hand-operated by a user, such as, in particular, a power drill, a drill hammer, a saw, a plane, a screwdriver, a milling tool, a grinder, an angle grinder, a multifunction tool, a construction site measuring device, and/or a garden tool such as a hedge trimmer, and shrub and/or grass shears. The hand-held power tool is preferably designed as a hand-held machine tool, i.e., as a workpiece-machining hand-held power tool. A "housing" is to be understood in particular as a component or an assembly, which is provided to protect at least the inductive charging unit and the rechargeable battery cells in relation to the surroundings from mechanical damage and/or soiling. In particular, the housing forms a multipart housing of the hand-held power tool rechargeable battery. In particular, the housing defines a shape and a size of the hand-held power tool rechargeable battery. The housing preferably has a fastening device for fastening the hand-held power tool rechargeable battery on the hand-held power tool. The housing preferably has contact recesses, through which an electrical contact may be established between the hand-held power tool and at least the rechargeable battery cell. A "rechargeable battery cell" is to be understood in this context in particular as a means which is provided for electrochemical storage of electrical energy with the aid of a reversible reaction. The rechargeable battery cell may preferably be formed by a lead rechargeable battery cell, a NiCd rechargeable battery cell, a NiMh rechargeable battery cell, but preferably a lithium-based rechargeable battery cell. The rechargeable battery cells may be formed by rechargeable battery cells of different nominal voltages, for example, nominal voltages of 1.2 V, 1.5 V, or advantageously approximately 3.6 V. The rechargeable battery cells preferably have a cylindrical shape, other shapes which appear meaningful to those skilled in the art also being possible. The hand-held power tool rechargeable battery advantageously has multiple rechargeable battery cells, for example, at least two, three, four, five, or ten. The rechargeable battery cells are connected in parallel and/or in series in particular. In particular, an "inductive charging unit" is to be understood as a unit for charging the rechargeable battery cell, which receives a charging current via induction and which includes at least the inductive charging coil and advantageously inductive charging electronics. The inductive charging unit preferably also includes at least one coil core to increase an inductance of the at least one inductive charging coil. A "coil core" is to be understood in this context in particular as a means, which is provided for focusing an electromagnetic field. In particular, the coil core is formed at least essentially from a magnetic material. A "magnetic material" is to be understood in this context in particular as a ferrimagnetic, in particular a magnetically soft, material. Alternatively or additionally, the coil core could also have ferromagnetic and/or antiferromagnetic materials. The magnetic material is advantageously formed by a ferrite material. A "ferrite" is to be understood in this context in particular as a material which is formed at least 70%, advantageously at least 80%, preferably at least 90%, from iron oxide ($Fe_2O_3$ and/or $Fe_3O_4$). The magnetic material preferably has a relative permeability μ greater than 100, preferably greater than 1,000, particularly preferably greater than 5,000. The coil core is advantageously implemented as at least one sintered component. The coil core is preferably manufactured with the aid of at least one sintering process, which gives the coil core its intended shape. Alternatively, the coil core could be implemented as a composite component, which is formed by a matrix material made of magnetic material, for example, sintered fragments, and a bonding agent, for example, a resin. The inductive charging unit advantageously has a coil carrier, which positions the inductive charging coil in relation to the coil core. The coil carrier has a recess, which is preferably implemented as a groove, to accommodate the inductive charging coil. The inductive charging coil is wound on the coil carrier in the recess in particular. The coil carrier has at least one receiving area for accommodating the coil core. The at least one receiving area is implemented in particular as a recess into which the coil core is placed. The inductive charging unit is advantageously provided to communicate with an inductive charger of the inductive charging device for control of the charging and in particular for foreign object recognition. An "inductive charging coil" is to be understood in this context in particular as a coil having at least one winding made of an electrically conductive material, which is provided, in at least one operating state, to receive electrical energy which is transmitted during a charging operation from an inductive charging coil of an inductive charger and to supply it via the inductive charging electronics to a rechargeable battery cell. In particular, the inductive charging coil is provided to convert an electromagnetic alternating field into an electric alternating current and/or vice versa. The alternating field preferably has a frequency of 10 kHz-500 kHz, particularly preferably 100 kHz-120 kHz. The inductive charging coil is preferably implemented as a wound coil; alternatively, the coil could be implemented as a coil attached to a circuit board. In particular, "charging" is to be understood as an operation during which power is inductively transmitted from the inductive charger to the hand-held power tool rechargeable battery. "Detachable" is to be understood as a nondestructive mechanical separation, without tools, of the inductive charging unit with the housing.

It is provided that the inductive charging coil on a coil plane of the inductive charging coil and the coil core on at least one plane in parallel to the coil plane have different basic shapes. A "coil plane" is to be understood in particular as a plane which extends through a center point of the inductive charging coil and is aligned perpendicularly to a direction of a field line at the center point. A main extension plane of the inductive charging coil is preferably aligned in parallel to the coil plane. A "plane in parallel to the coil plane" is to be understood in particular as a plane which is aligned in parallel to the coil plane and which may be spaced apart from the coil plane. The plane is preferably situated spaced apart from the coil plane. A "basic shape on a plane" is to be understood in particular as a shape of a maximum extension of the inductive charging coil or the coil core along an intersecting surface with the plane. The phrase "different basic shapes" is to be understood in particular to mean that the inductive charging coil and the coil core have shapes which differ by more than 10%, advantageously more than 20%, if the shapes have an equal area size. Advantageously space-saving shielding of at least the rechargeable battery cells may be achieved due to the design according to the present invention of the hand-held power tool rechargeable battery.

In another embodiment, it is provided that the inductive charging coil has a circular basic shape on the coil plane of the inductive charging coil, whereby optimum charging may be achieved in different alignments of the hand-held power tool rechargeable battery in relation to an inductive charging unit around a winding axis of the inductive charging coil. A "circular basic shape" is to be understood in particular as a shape on the plane, the external extension of which is implemented as at least essentially circular. "Essentially" is to be understood in particular to mean less than 10% deviation, advantageously less than 5% deviation.

Furthermore, it is provided that the coil core has a rectangular basic shape on the plane in parallel to the coil plane, whereby an optimum overall size and structural shape may be achieved. A "rectangular basic shape" is to be understood in particular as a shape, the external extension of which is implemented as at least essentially rectangular. The coil core preferably has a rectangular basic shape having rounded corners in the plane. The plane is preferably situated in parallel to the coil plane and spaced apart by at least 1 mm, advantageously at least 2 mm, particularly advantageously at least 4 mm from the coil plane. Alternatively, the coil core could have a circular basic shape on the plane in parallel to the coil plane. In particular, the coil core has multiple, preferably four, in particular uniform parts in this case, which are formed by circular sectors.

Furthermore, it is provided that the coil core spans a larger area on the plane than the inductive charging coil on the coil plane, whereby advantageous shielding is possible. In particular, the phrase "span a larger area" is to be understood to mean that the intersection of the inductive charging coil on the coil plane has a larger area than the intersection of the coil core on the other plane. The coil core preferably has an area at least 5% larger, advantageously has an area at least 10% larger on the plane than the inductive charging coil on the coil plane.

In addition, it is provided that the coil core has a multipart design, whereby a low mechanical sensitivity may be achieved. Alternatively, the coil core could be implemented in one piece. The term "multipart" is to be understood in particular to mean that the coil core has at least two one-piece parts. The parts preferably have an identical shape. In particular, the parts are implemented in the shape of pizza slices. The parts are preferably situated regularly, particularly preferably symmetrically. In the case of a coil core which has a rectangular basic shape, four essentially equivalent parts are preferably provided. The four parts at least essentially form quadrants of the rectangular basic shape. The external corners of the quadrants may be rounded.

To accommodate the parts of the multipart coil core, the coil carrier advantageously has multiple receiving areas, in such a way that one receiving area is provided for each part. The parts are situated in relation to one another on the coil carrier by accommodating the parts in the receiving areas. The receiving areas are formed in particular by recesses, into which the parts are placed. The recesses in particular have a shape which is essentially complementary to the shape of the parts. Two recesses adjacent to one another are separated from one another by a wall in particular. The wall between two recesses is used as a spacer element for spacing apart two parts of the coil core which are adjacent to one another.

Furthermore, it is provided that the inductive charging unit forms an independently testable assembly, whereby a test of the inductive charging unit is possible at an early production point in time. An "assembly" is to be understood in particular as a number of components, which are provided to form a stable unit when connected to one another. In particular, an "independently testable assembly" is to be understood in this context as an assembly, the function of which is testable separately from the rechargeable battery cells and/or from hand-held power tool electronics in particular. In particular, the assembly is advantageously usable in various rechargeable battery types with only geometrical modifications of individual components, for example, a housing part.

In one advantageous implementation of the present invention, it is provided that the inductive charging unit is connected with the aid of at least one connecting means to the assembly. The connecting means is in particular a connecting means for the detachable mechanical connection of the individual components to the assembly. The connecting means is in particular a nonmagnetic connecting means, whereby a high quality may be achieved in the case of an energy transfer of the charging operation. A "nonmagnetic connecting means" is to be understood in particular as a means which is provided to fasten the components of the inductive charging unit to one another, and which has a magnetic permeability of less than 10, advantageously less than 2, particularly advantageously essentially 1. The connecting means is preferably made of a nonmetallic material. The connecting means is preferably formed by an electrically insulating and nonmagnetic material.

Furthermore, it is provided that the inductive charging unit has inductive charging electronics, which are provided to charge the rechargeable battery cell, whereby an advantageous protection of the rechargeable battery cells is possible with a simple design. In particular, "inductive charging electronics" are to be understood as electronics which are provided to at least control the charging operation. The inductive charging electronics are preferably provided to communicate with the inductive charger for controlling the charging operation and/or for foreign object recognition.

Furthermore, it is provided that the inductive charging unit includes a housing part of the hand-held power tool rechargeable battery. The inductive charging unit thus obtains a structure which is comparatively mechanically robust as an independently testable assembly.

In one advantageous embodiment, the connecting means is implemented for the mechanically detachable connection of the components of the inductive charging unit to an assembly on the housing part of the hand-held power tool rechargeable battery. The inductive charging unit may thus be connected to the assembly in a structurally simple manner. A "housing part" is to be understood in particular as a means which includes at least one outer side of the hand-held power tool rechargeable battery. The housing part advantageously includes an inductive charging side. An "inductive charging side" is to be understood in particular as an outer side of the housing, through which the inductive charging coil receives the magnetic energy. In particular, the inductive charging side is aligned perpendicularly to a winding axis of the inductive charging coil and is situated closest to the inductive charging coil. The term "latch" is to be understood to mean in particular that the housing part includes a formfitting means, which couples to the inductive charging electronics upon the joining together of the inductive charging unit. The housing preferably includes at least two housing parts. The two housing parts may be implemented as housing half shells, for example. The housing particularly preferably includes more than two housing parts, for example, four housing parts, which advantageously each delimit the housing on different sides.

In addition, it is provided that the hand-held power tool rechargeable battery has a heat compensation means, which is provided to distribute heat uniformly, whereby uniform heating of the rechargeable battery cells in particular may be achieved. Damage to individual rechargeable battery cells during a rapid charge may thus be prevented. In particular, a "heat compensation means" is to be understood as a means which is provided to conduct heat from one point to another point. The heat compensation means preferably has a thermal conductivity λ greater than 50 W/(m K), advantageously greater than 100 W/(m K), particularly advantageously greater than 200 W/(m K). The heat compensation means preferably includes at least one heat conductive metal which appears meaningful to those skilled in the art, but advantageously copper, silver, and/or particularly advantageously aluminum. Alternatively, the heat compensation means could include another heat compensation element which appears meaningful to those skilled in the art, for example, at least one heat pipe. The heat compensation means is preferably a component of the inductive charging unit. The heat compensation means preferably has a heat conduction cross-sectional area greater than 10 mm², particularly preferably greater than 20 mm² The phrase "distribute heat uniformly" is to be understood in particular to mean that the heat compensation means relays heat arising at one position, in particular on the inductive charging electronics during a charging operation, to a larger area, particularly advantageously to all rechargeable battery cells.

The inductive charging unit (14) has a coil carrier (50) including a groove (49) for accommodating the inductive charging coil (18).

The coil carrier (50) has at least one receiving area (51) for accommodating the coil core (16).

The hand-held power tool rechargeable battery according to the present invention is not to be restricted in this case to the above-described application and specific embodiment. In particular, the hand-held power tool rechargeable battery according to the present invention may have a number of individual elements, components, and units deviating from a number mentioned herein to fulfill a functionality described herein.

DETAILED DESCRIPTION

Figure 1:
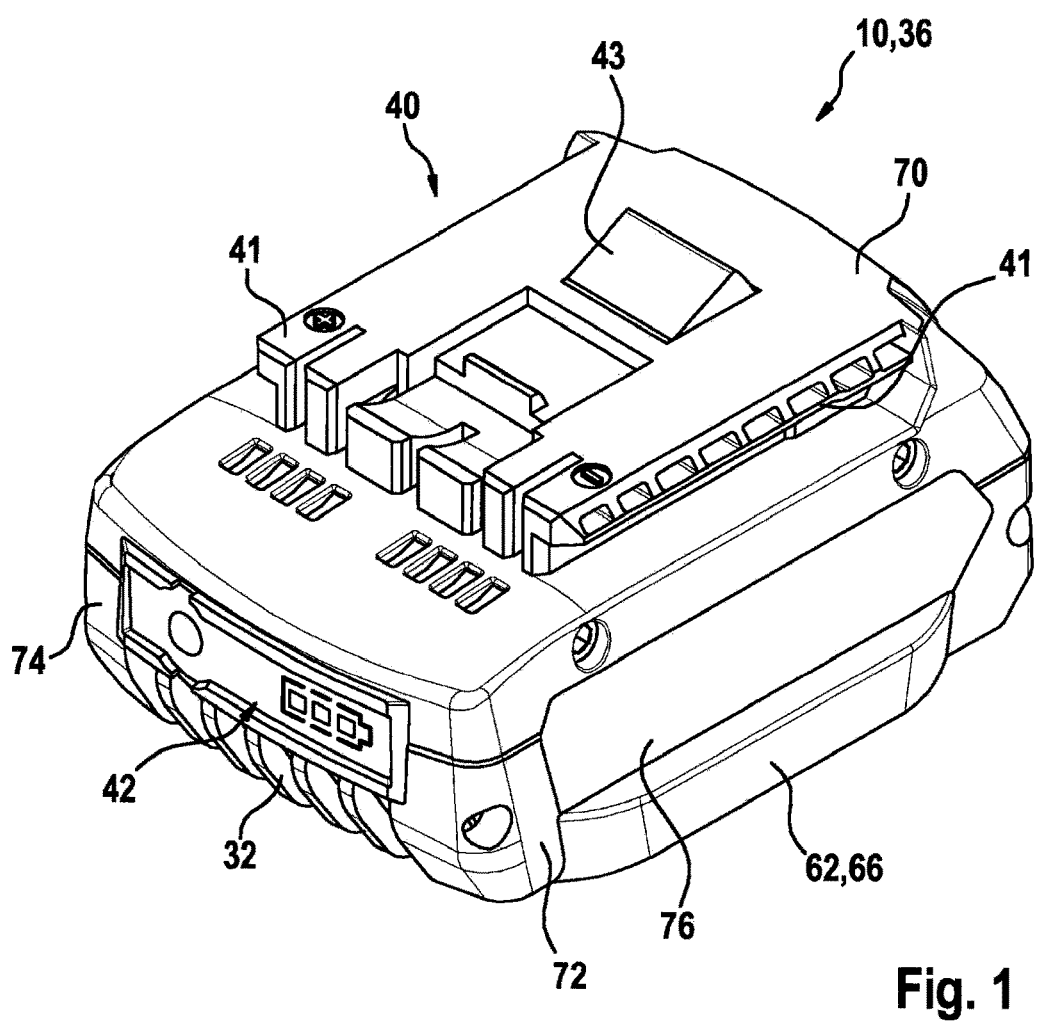
FIG. 1 shows a hand-held power tool rechargeable battery according to the present invention in a perspective view.
Figure 2:
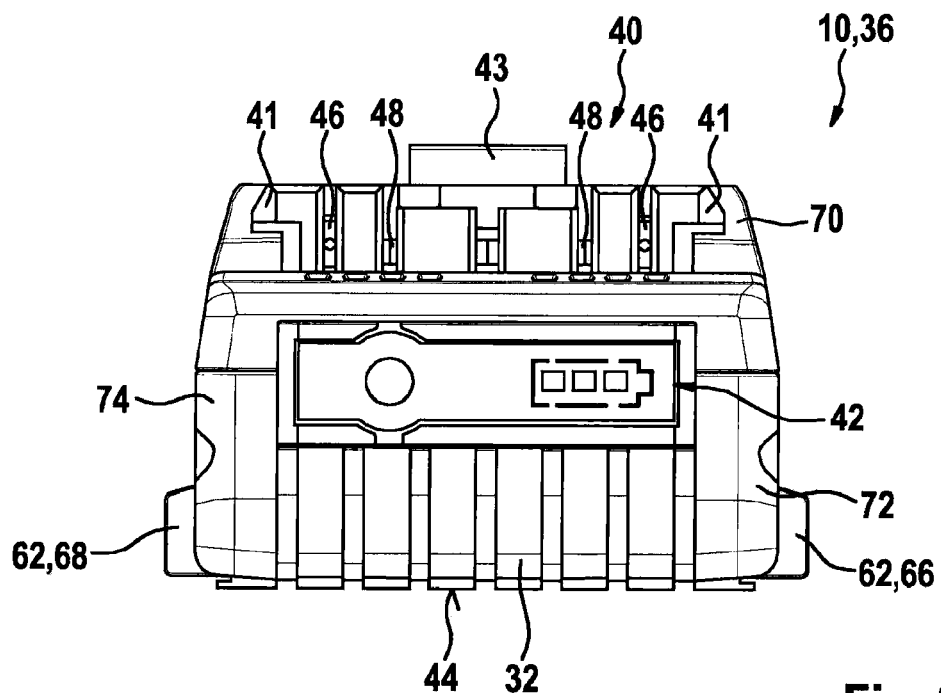
FIG. 2 shows a frontal view of the hand-held power tool rechargeable battery from FIG. 1.
Figure 3:
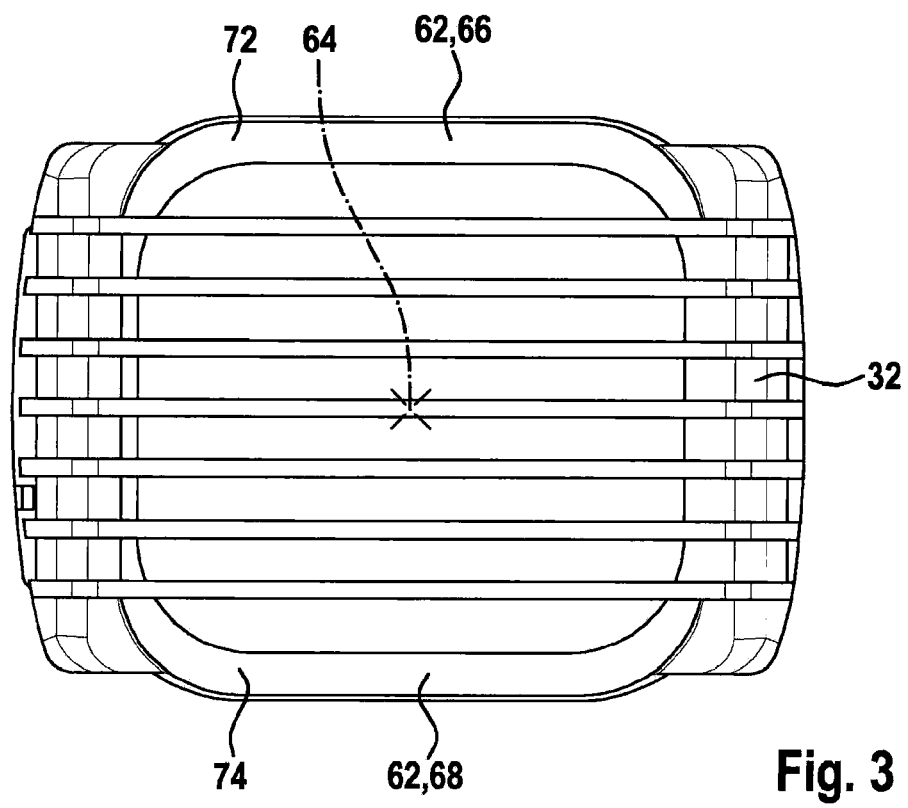
FIG. 3 shows an inductive charging side of the hand-held power tool rechargeable battery from FIG. 1.

FIGS. 1 through 6 show a hand-held power tool rechargeable battery 10 according to the present invention including multiple rechargeable battery cells 12, an inductive charging unit 14, a heat compensation means 34, a housing 36, hand-held power tool electronics 38, a hand-held power tool interface 40, and a charge state display 42. During operation of a hand-held power tool (not shown in greater detail), hand-held power tool rechargeable battery 10 provides operating energy of the hand-held power tool. Rechargeable battery cells 12 are provided to store the operating energy between a charging operation and a delivery of the operating energy. Hand-held power tool rechargeable battery 10 includes five rechargeable battery cells 12. Rechargeable battery cells 12 are connected in series. Therefore, a nominal voltage of hand-held power tool rechargeable battery 10 is 18 V in the case of a rechargeable battery cell voltage of 3.6 V.

Charge state display 42 is provided to display a charge state of rechargeable battery cells 12 to an operator. Hand-held power tool interface 40 is provided to contact hand-held power tool rechargeable battery 10 mechanically and electrically with the hand-held power tool. Hand-held power tool interface 40 is situated on a side which is situated facing away from an inductive charging side 44 of housing 36, and specifically the side is situated opposite inductive charging side 44. Hand-held power tool interface 40 includes contacts 46 for energy transfer and contacts 48 for communication with the hand-held power tool. Hand-held power tool electronics 38 are provided to control a discharge and optionally a charge of rechargeable battery cells 12 via hand-held power tool interface 40. Hand-held power tool interface 40 includes guide rails 41 and a locking bar 43 for mechanical coupling with the hand-held power tool.

Housing 36 defines an external shape of hand-held power tool rechargeable battery 10. Housing 36 is provided to protect at least rechargeable battery cells 12 and hand-held power tool electronics 38 from external effects. Housing 36 connects at least inductive charging unit 14, rechargeable battery cells 12, and hand-held power tool interface 40 to one another.

Figure 7:
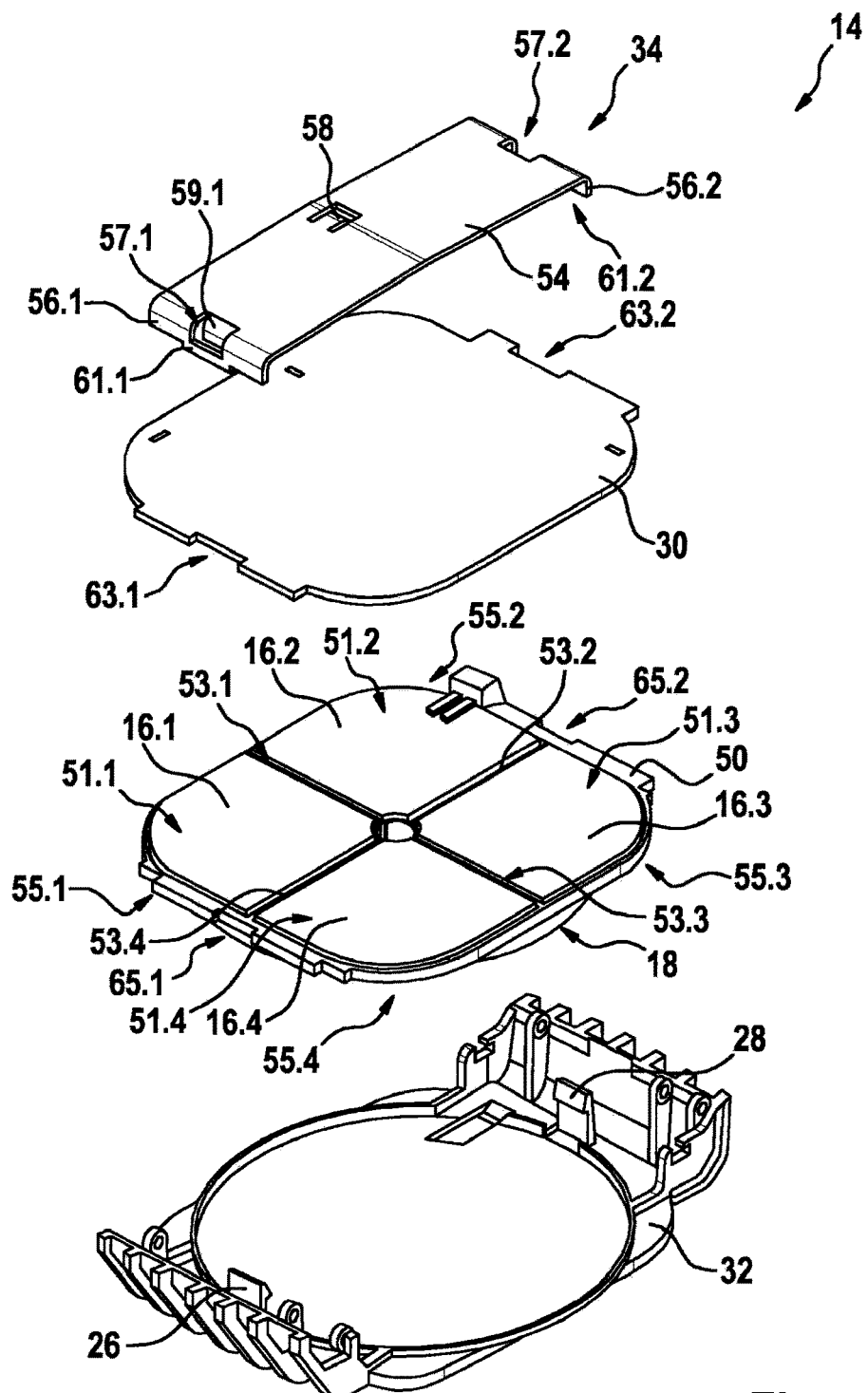
FIG. 7 shows an inductive charging unit and a heat compensation means of the hand-held power tool rechargeable battery from FIG. 1 in an exploded view.
Figure 8:
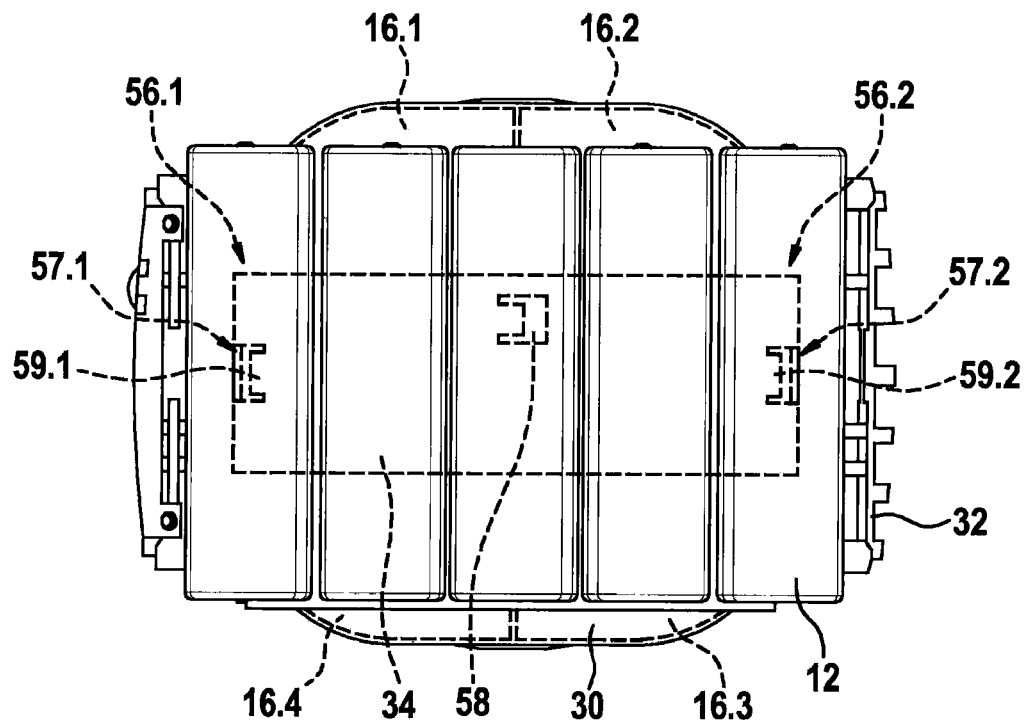
FIG. 8 shows the inductive charging unit and rechargeable battery cells of the hand-held power tool rechargeable battery from FIG. 1 in a top view of an upper side.

FIGS. 7 and 8 show inductive charging unit 14. Inductive charging unit 14 includes a coil core 16, an inductive charging coil 18, inductive charging electronics 30, a housing part 32, heat compensation means 34, and a coil carrier 50. Coil carrier 50 (shown in greater detail in FIG. 9) is provided to arrange coil core 16 and inductive charging coil 18 in relation to one another. Coil carrier 50 has a groove 49, in which inductive charging coil 18 is wound. Groove 49 has a circular profile. Groove 49 is implemented as open on an outer side to accommodate inductive charging coil 18.

Coil carrier 50 delimits multiple receiving areas 51.1, 51.2, 51.3, 51.4, in each of which one of multiple parts 16.1, 16.2, 16.3, 16.4 of coil core 16 is accommodated. Coil carrier 50 has wall elements 53.1, 53.2, 53.3, 53.4 for delimiting receiving areas 51.1, 51.2, 51.3, 51.4. Parts 16.1, 16.2, 16.3, 16.4 of coil core 16 are spaced apart from one another by wall elements 53.1, 53.2, 53.3, 53.4. Receiving areas 51.1, 51.2, 51.3, 51.4 are furthermore each delimited by a base element 55.1, 55.2, 55.3, 55.4. Base elements 55.1, 55.2, 55.3, 55.4 form a one-piece base 55. Parts 16.1, 16.2, 16.3, 16.4 are arranged spaced apart from inductive charging coil 18 by base 55. In addition, coil carrier 50 is provided for spacing apart contacts 52 on ends of the winding of inductive charging coil 18 from one another, whereby a high operational reliability is achieved, because a short-circuit between contacts 52 of inductive charging coil 18, in particular due to touching of contacts 52, is prevented.

Figure 4:
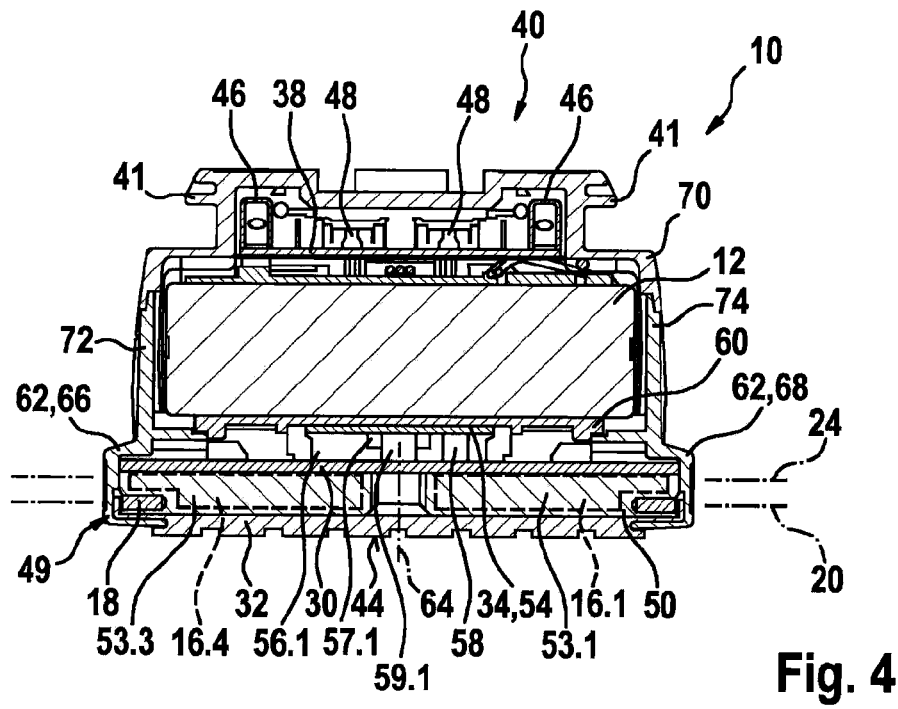
FIG. 4 shows a first section through the hand-held power tool rechargeable battery from FIG. 1.
Figure 5:
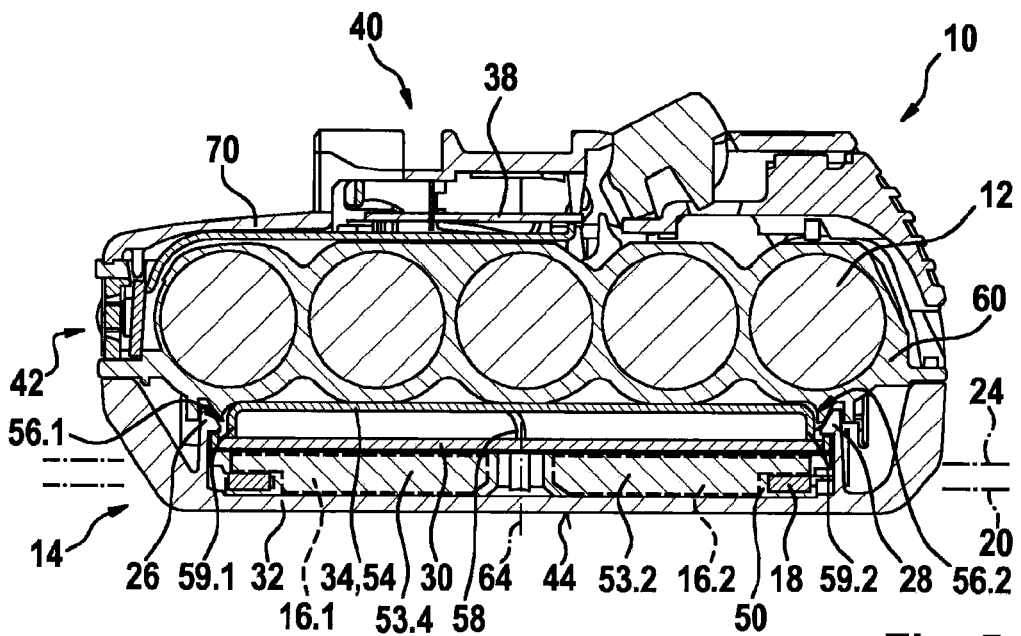
FIG. 5 shows a second section through the hand-held power tool rechargeable battery from FIG. 1.
Figure 6:
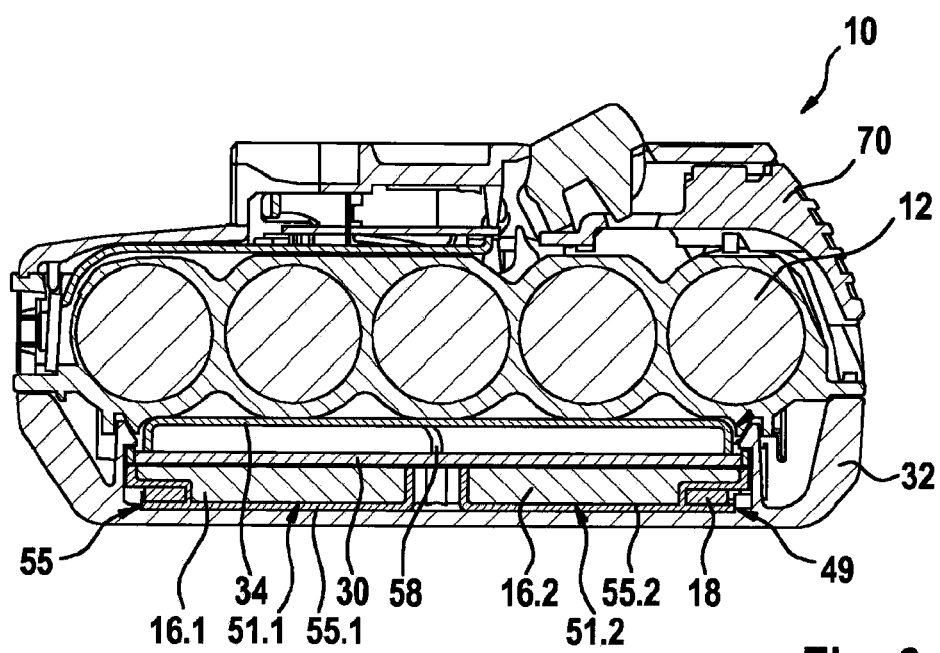
FIG. 6 shows a third section through the hand-held power tool rechargeable battery from FIG. 1 in parallel to the second section through the hand-held power tool rechargeable battery through a coil core of the hand-held power tool rechargeable battery.

The section lines of FIGS. 4 and 5 each extend through two of wall elements 53.1, 53.2, 53.3, 53.4. Parts 16.1, 16.2, 16.3, 16.4, which are arranged concealed by wall elements 53.1, 53.2, 53.3, 53.4, are shown by dashed lines in FIGS. 4 and 5. The section line of FIG. 6 extends in parallel to the section line from FIG. 5, but off-center and through two of parts 16.1, 16.2 instead of through two of wall elements 53.2, 53.4.

Figure 9:
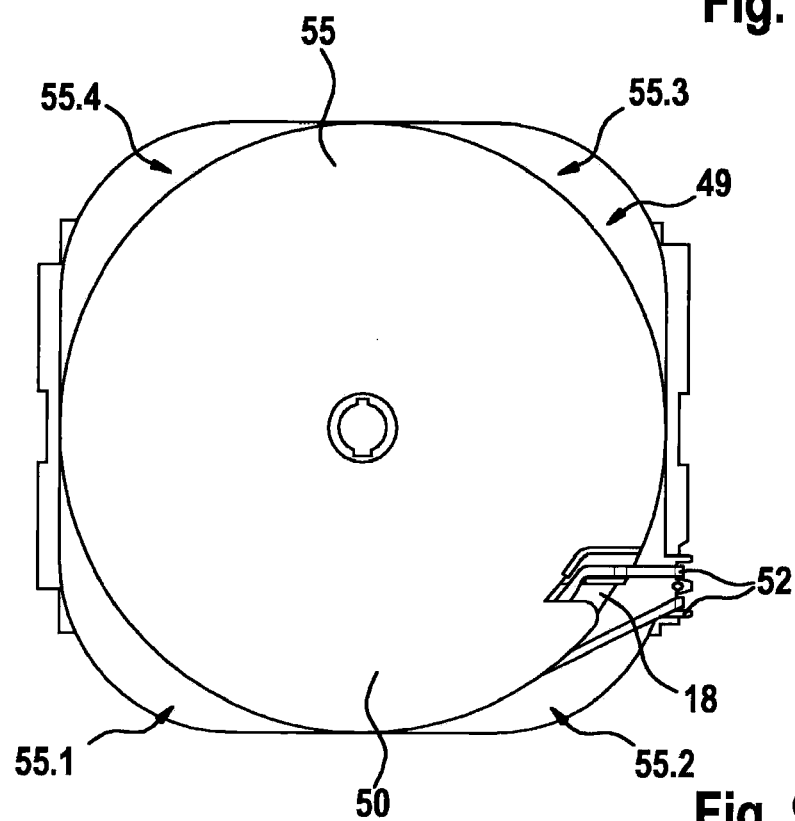
FIG. 9 shows a coil carrier and an inductive charging coil of the hand-held power tool rechargeable battery from FIG. 1 in a top view of the inductive charging side.
Figure 10:
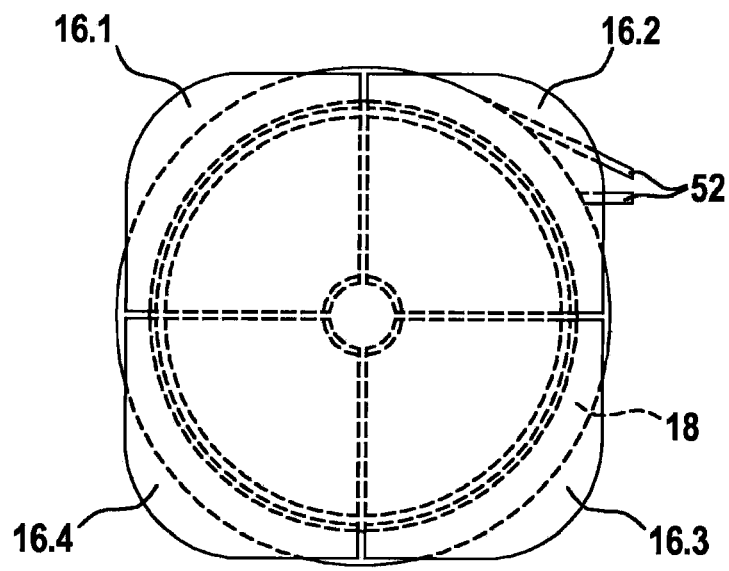
FIG. 10 shows a coil core and the inductive charging coil of the hand-held power tool rechargeable battery from FIG. 1 in a top view of an upper side.
Figure 11:
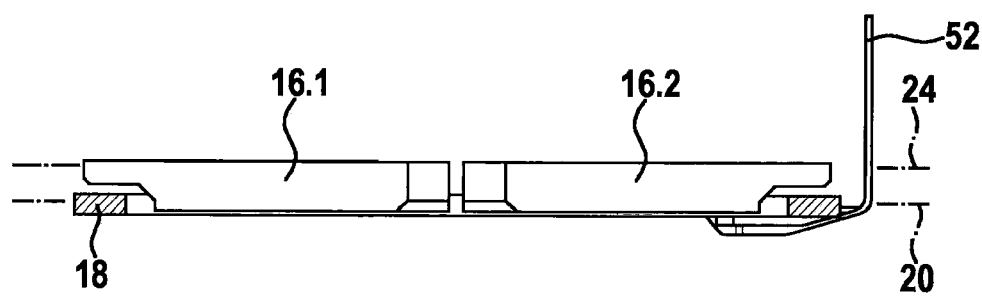
FIG. 11 shows the coil core and the inductive charging coil from FIG. 8 in a lateral sectional view.

FIGS. 9 and 10 only show coil core 16 and inductive charging coil 18. Inductive charging coil 18 is wound onto coil carrier 50 (not shown in FIGS. 9 and 10) from the outside. Inductive charging coil 18 receives, during a charging operation, magnetic energy of an inductive charging coil of an inductive charger (not shown in greater detail) through inductive charging side 44 of housing 36. Inductive charging coil 18 of hand-held power tool rechargeable battery 10 has a circular basic shape on a coil plane 20 of inductive charging coil 18. Inductive charging coil 18 has a diameter of 77 mm. Inductive charging coil 18 encloses coil core 16 on coil plane 20.

Coil core 16 is made of a ferromagnetic material, specifically a ferrite. Coil core 16 has multiple parts 16.1, 16.2, 16.3, 16.4, four parts here. Alternatively, coil core 16 could have another number of parts which appears meaningful to those skilled in the art, for example, two, three, five, six, or more parts, or could be implemented in one piece. The parts of coil core 16 are implemented and situated in the shape of pizza slices.

Coil core 16 has, on a plane 24, which is aligned in parallel to coil plane 20 and is situated between coil plane 20 and inductive charging electronics 30, a rectangular basic shape having rounded corners. Therefore, inductive charging coil 18 on coil plane 20 of inductive charging coil 18 and coil core 16 on plane 24 in parallel to coil plane 20 have different basic shapes. Two parallel outer sides of coil core 16 have a spacing on plane 24 of 74.6 mm. The rounded corners of coil core 16 have a radius of 19.4 mm.

Coil core 16 widens, viewed from coil plane 20, in the direction of rechargeable battery cells 12. Coil core 16 has a greatest extension area on plane 24 between coil plane 20 and inductive charging electronics 30. This extension area has a larger area than an extension area of inductive charging coil 18 on coil plane 20. In coil plane 20, coil core 16 has a diameter of essentially 61 mm. The specified dimensions of coil core 16 and inductive charging coil 18 are exemplary dimensions, which those skilled in the art will adapt to the particular field of use, in particular as a function of a rechargeable battery size.

Housing part 32 of housing 36, which includes inductive charging side 44, is a component of inductive charging unit 14. Housing part 32 includes connecting means 26, 28, which are provided to connect the components of inductive charging unit 14 to form a mechanically stable and independently testable assembly. Alternatively, another part of inductive charging unit 14 which appears meaningful to those skilled in the art could have connecting means.

Connecting means 26, 28 are implemented in one piece with housing part 32 and are therefore made of a nonmagnetic material, specifically a plastic which appears meaningful to those skilled in the art. Connecting means 26, 28 are implemented as catch hooks. Connecting means 26, 28 are used for the mechanically detachable connection of the components of inductive charging unit 14 to one another. Connecting means 26, 28 of housing part 32 are latched in an installed operating state with heat compensation means 34. Heat compensation means 34 in turn fastens inductive charging electronics 30. Alternatively or additionally, connecting means 26, 28 could latch with inductive charging electronics 30. Connecting means 26, 28 are situated on opposing sides of inductive charging electronics 30. Connecting means 26, 28 fasten inductive charging electronics 30 at least in a formfitting manner via heat compensation means 34.

Inductive charging electronics 30 is provided to charge rechargeable battery cell 12 with energy received from inductive charging coil 18. Contacts 52 of inductive charging coil 18 are connected, specifically soldered here, to inductive charging electronics 30 on a side facing away from inductive charging side 44. For this purpose, inductive charging electronics 30 have a placement (not shown in greater detail) on a side facing toward rechargeable battery cells 12. A circuit board of inductive charging electronics 30 is implemented as two-layered. On a side facing away from rechargeable battery cells 12, inductive charging electronics 30 have a copper plating (not shown in greater detail). The copper plating has multiple partial areas, which appear meaningful to those skilled in the art, having different potentials. Components of the placement which heat up strongly during operation are thermally connected to the copper plating for cooling. The copper plating has a lacquer coating for insulation on a side facing toward coil core 16. The copper plating has a smaller extension area in parallel to plane 24 than coil core 16 on plane 24, whereby a high quality may advantageously be achieved. In particular, a projection of the copper plating perpendicular to plane 24 is located at least essentially completely inside a projection of coil core 16 perpendicularly to plane 24.

Heat compensation means 34 is situated between inductive charging electronics 30 and rechargeable battery cells 12. Heat compensation means 34 is provided to distribute heat of inductive charging electronics 30 uniformly to rechargeable battery cells 12. Heat compensation means 34 has a heat conduction layer 54 and fastening means 56, 58. Heat conduction layer 54 extends at least essentially in parallel to a main extension of inductive charging electronics 30. Heat conduction layer 54 has a maximum projection area which is at least 50% of a maximum projection area of inductive charging electronics 30. Heat conduction layer 54 is implemented as an aluminum layer. Heat conduction layer 54 has a layer thickness of 1 mm. Heat conduction layer 54 has a length in parallel to the main extension of inductive charging electronics 30 which essentially corresponds to a length of inductive charging electronics 30, specifically 77.5 mm in this case. Heat conduction layer 54 is situated spaced apart from the circuit board of inductive charging electronics 30, specifically by at least 3.6 mm here.

Heat compensation means 34 is manufactured from a cut-out and/or stamped-out aluminum plate. The three fastening means 56.1, 56.2, 58 are formed by a bending process and/or an embossing process. Two first ones of fastening means 56.1, 56.2 are situated on opposing ends of heat conduction layer 54. The two first ones of fastening means 56.1, 56.2 each have a catch recess 57. Connecting means 26, 28 engage in catch recesses 57 in an installed state. Catch recesses 57 are formed by bending in tabs 59.1, 59.2. Tabs 59.1, 59.2 press on inductive charging electronics 30 in an installed operating state. Fastening means 56.1, 56.2 each have a formfitting means 61.1, 61.2. Formfitting means 61.1, 61.2 each engage in formfitting recesses 63.1, 63.2 of inductive charging electronics 30. Formfitting means 61.1, 61.2 fasten inductive charging electronics 30 in directions parallel to a main extension plane of inductive charging electronics 30.

A second of fastening means 58 is situated centrally on heat conduction layer 54. Second fastening means 58 is implemented as a bent-in tab and presses in an installed operating state approximately centrally on inductive charging electronics 30. Fastening means 56, 58 are provided to space heat conduction layer 54 apart from inductive charging electronics 30.

Inductive charging electronics 30 holds parts 16.1, 16.2, 16.3, 16.4 of coil core 16 in receiving areas 51.1, 51.2, 51.3, 51.4. For this purpose, inductive charging electronics 30 close receiving areas 51.1, 51.2, 51.3, 51.4 on a side facing away from base elements 55.1, 55.2, 55.3, 55.4 of coil carrier 50. Coil carrier 50 is connected in a form-fitting and rotationally locked manner to housing part 32 of inductive charging unit 14. Coil carrier 50 has fastening recesses 65.1, 65.2 for this purpose, in which connecting means 26, 28 engage.

Heat compensation means 34 is additionally clamped in an operational state between inductive charging electronics 30 and a cell holder 60 of hand-held power tool rechargeable battery 10. Heat compensation means 34 abuts flatly in places against cell holder 60 of hand-held power tool rechargeable battery 10. During the assembly, heat conduction layer 54 of heat compensation means 34 is bent. Hand-held power tool rechargeable battery 10 does not have metallic cooling means on an outer side.

Hand-held power tool rechargeable battery 10 has at least two thermal sensors (not shown in greater detail). With the aid of one of the thermal sensors, inductive charging electronics 30 measure a temperature of rechargeable battery cells 12. With the aid of one of the thermal sensors, hand-held power tool electronics 38 measure a temperature of rechargeable battery cells 12. The thermal sensors are situated between rechargeable battery cells 12. Alternatively or additionally, inductive charging electronics 30 and hand-held power tool electronics 38 could use one or more shared thermal sensors for measuring the temperature of rechargeable battery cells 12.

Housing 36 has a fastening means 62 for fastening on the inductive charger in a direction in parallel to a winding axis 64 of inductive charging coil 18. Fastening means 62 has a first fastening area 66 and a second fastening area 68, which are situated on opposing sides of inductive charging side 44 of housing 36. Fastening areas 66, 68 are wing-shaped. Fastening areas 66, 68 are implemented as receiving shoulders. Fastening areas 66, 68 each are rail-shaped. Inductive charging coil 18 is partially situated inside fastening areas 66, 68.

As shown in FIG. 4 in particular, housing 36 has four housing parts 32, 70, 72, 74. A first of the four housing parts 32 delimits housing 36 of inductive charging side 44. A second of the four housing parts 70 delimits housing 36 primarily on a side opposite inductive charging side 44. Second housing part 70 forms areas of hand-held power tool interface 40. Second housing part 70 forms guide rails 41 and locking bar 43 here. A third and fourth of the four housing parts 72, 74 delimit hand-held power tool rechargeable battery 10 on two lateral sides 76, on which fastening means 62 are situated. Third and fourth housing parts 72, 74 are each screwed onto cell holder 60. Second housing part 70 is also screwed onto cell holder 60. First housing part 32 is fastened in a form-fitting manner between third and fourth housing parts 72, 74.

Figure 12:
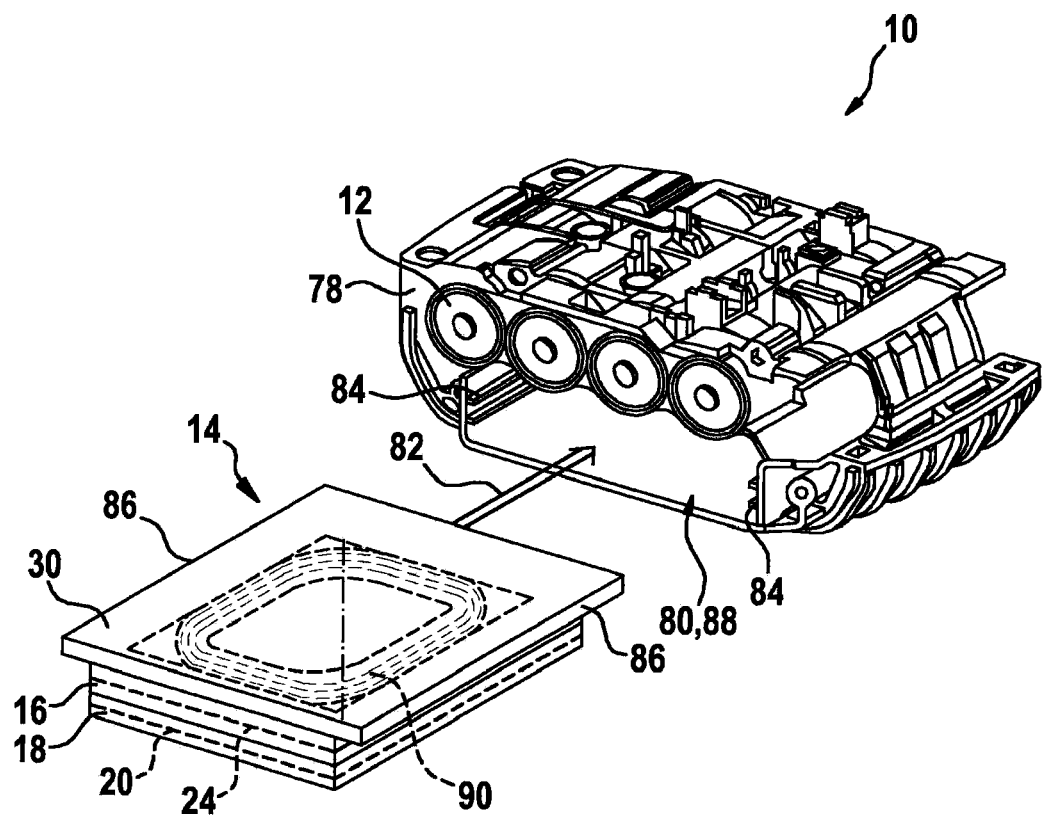
FIG. 12 shows an exemplary embodiment over a hand-held power tool rechargeable battery.

FIG. 12 shows a part of another alternative exemplary embodiment of a hand-held power tool rechargeable battery 10 including rechargeable battery cells 12, an inductive charging unit 14, and a housing part 78. Further housing parts of a housing are not shown. Inductive charging unit 14 includes a coil core 16, an inductive charging coil 18, and inductive charging electronics 30. Similarly to housing part 32 from FIGS. 1 and 7, housing part 78 has the inductive charging side and forms a component of inductive charging unit 14. Housing part 78 includes connecting means 84, which are provided to connect the components of inductive charging unit 14 to form a mechanically stable and independently testable assembly.

Connecting means 84 are implemented in one piece with housing part 78 and therefore made of a nonmagnetic material, specifically a plastic which appears meaningful to those skilled in the art. Connecting means 84 are implemented as guide rails. Connecting means 84 are used for the mechanically detachable connection of the components of inductive charging unit 14 to one another.

Housing part 78 forms a pocket-like receiving area 80. Housing part 78 is provided to accommodate inductive charging unit 14 in pocket-like receiving area 80. Housing part 78 has, in receiving area 80, two guide rails 84 situated in parallel to insertion direction 82. Inductive charging unit 14 is inserted in an insertion direction 82 into pocket-like receiving area 80. Insertion direction 82 is aligned perpendicularly to a winding axis 64 of inductive charging coil 18. Two edges 86 of inductive charging electronics 30 are inserted into guide rails 84 in an assembled state.

Coil core 16 is formed by core elements, which are bonded using a bonding agent. The core elements are implemented as sintered fragments. Alternatively or additionally, the coil core could have multiple sintered molded parts, which are glued to one another in particular. Coil core 16 has a rectangular shape on a plane 24. Alternatively, the coil core may also be formed by multiple parts situated adjacent to one another—as described in conjunction with FIGS. 7 and 8.

Inductive charging coil 18 is formed by a circuit board, which has printed conductors 90. Printed conductors 90 are connected to a connecting lead (not shown in greater detail), so that printed conductors 90 electrically form a single coil. Inductive charging coil 18 has a rectangular basic shape including rounded corners on a coil plane 20. Alternatively, inductive charging coil 18 could have a circular basic shape on coil plane 20. Therefore, inductive charging coil 18 on coil plane 20 of inductive charging coil 18 and coil core 16 on at least one plane 24 in parallel to coil plane 20 have different basic shapes. Alternatively, the inductive charging coil may also be formed by a coil having multiple windings, however—as described in conjunction with FIGS. 7 and 8. Furthermore, inductive charging coil 18 may alternatively also have an essentially circular basic shape.

Inductive charging coil 18, coil core 16, and inductive charging electronics 30 are connected to one another to form an independently testable assembly. Inductive charging coil 18, coil core 16, and inductive charging electronics 30 are glued here, but may alternatively also be connected in another way which appears meaningful to those skilled in the art. Inductive charging coil 18 and inductive charging electronics 30 are electrically connected with the aid of a connecting lead (not shown in greater detail), which is led through coil core 16.

What is claimed is:

1. A hand-held power tool rechargeable battery, comprising:
    a housing;
    at least one rechargeable battery cell; and
    an inductive charging unit disposed in the housing of the rechargeable battery that includes at least one coil core and an inductive charging coil for charging the at least one rechargeable battery cell, wherein the inductive charging unit including the at least one coil core and the inductive charging coil are disposed in the housing of the rechargeable battery and are accommodated detachably in the housing of the rechargeable battery.

2. The hand-held power tool rechargeable battery as recited in claim 1, wherein the inductive charging coil is disposed on a coil plane of the inductive charging coil, and wherein the coil core is disposed on at least one plane in parallel to the coil plane, the inductive charging coil and the coil core having different basic shapes.

3. The hand-held power tool rechargeable battery as recited in claim 1, wherein the inductive charging coil has a circular basic shape on the coil plane of the inductive charging coil.

4. The hand-held power tool rechargeable battery as recited in claim 1, wherein the coil core has a rectangular basic shape on the plane in parallel to the coil plane.

5. The hand-held power tool rechargeable battery as recited in claim 1, wherein the coil core spans a larger area on the plane parallel to the coil plane than the inductive charging coil on the coil plane.

6. The hand-held power tool rechargeable battery as recited in claim 1, wherein the coil core has a multipart design.

7. The hand-held power tool rechargeable battery as recited in claim 1, wherein the inductive charging unit forms an independently testable assembly.

8. The hand-held power tool rechargeable battery as recited in claim 7, wherein the inductive charging unit is connected with the aid of at least one connecting arrangement to the assembly.

9. The hand-held power tool rechargeable battery as recited in claim 1, wherein the inductive charging unit includes inductive charging electronics that are provided to charge the rechargeable battery cell.

10. The hand-held power tool rechargeable battery as recited in claim 8, wherein the inductive charging unit includes a housing part of the hand-held power tool rechargeable battery.

11. The hand-held power tool rechargeable battery as recited in claim 10, wherein the connecting arrangement is implemented on the housing part.

12. The hand-held power tool rechargeable battery as recited in claim 1, further comprising a heat compensation arrangement provided to distribute heat uniformly.

13. The hand-held power tool rechargeable battery as recited in claim 1, wherein the inductive charging unit includes a coil carrier that includes a groove for accommodating the inductive charging coil.

14. The hand-held power tool rechargeable battery as recited in claim 13, wherein the coil carrier has at least one receiving area for accommodating the coil core.

15. An inductive charging unit, comprising:
    at least one coil core; and
    an inductive charging coil for charging at least one rechargeable battery cell, wherein the inductive charging unit including the at least one coil core and the inductive charging coil are disposed in the housing and are accommodated detachably in the housing.

16. The hand-held power tool rechargeable battery as recited in claim 1, wherein the inductive charging unit and the rechargeable battery cells are disposed within a single housing.

\* \* \* \* \*